Aug. 16, 1932.   W. J. GIBBONS   1,871,684

LOCKING DEVICE FOR SCREWS AND THE LIKE

Filed Nov. 29, 1930

INVENTOR
William J. Gibbons
By
Cyrus H. Anderson
Attorney

Patented Aug. 16, 1932

1,871,684

UNITED STATES PATENT OFFICE

WILLIAM JAMES GIBBONS, OF PHILADELPHIA, PENNSYLVANIA

LOCKING DEVICE FOR SCREWS AND THE LIKE

Application filed November 29, 1930. Serial No. 498,969.

My invention relates to locking devices for screws and the like of the character shown in my previous Letters Patent of the United States, No. 1,707,933, issued April 2, 1929, and it has for its general object to provide a novel device which is effective as a locking instrumentality to prevent backing out of screws and the like under any and all conditions.

A further object of the invention is to provide means whereby the locking washer may be rotatably adjusted with respect to the screw or the like, even after the latter has been screwed down so as to firmly clamp the object, such, for example, as an electric terminal, and various kinds of mechanical plates and parts which it is intended to hold and secure in position.

To the foregoing and other ends my invention comprehends the construction and arrangement as hereinafter described in detail, particularly pointed out in the claims and as illustrated in the drawing wherein I have illustrated certain embodiments of the invention in the form which at present are preferred by me; but it will be understood that the invention is susceptible of embodiment in other forms of construction than are shown and that changes in the details of construction may be made within the scope of the claims without departing from the invention.

Figure 1:
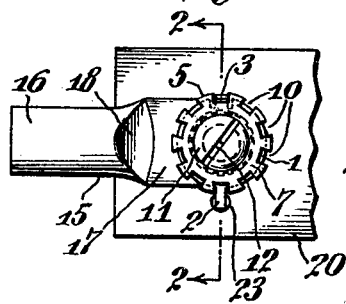
Fig. 1 is a view in top plan of a device embodying the invention, the same being shown in connection with an electric terminal and a support therefor.

In the several forms of the device as illustrated, the construction of the annular locking washer or element 1 is the same and it is provided with fingers 2 and 3 which project outwardly from diametrically opposed points of the outer edge of said washer.

Referring now to Figs. 1 to 7 inclusive, it will be noted that I have provided a screw having a screw-threaded portion 4 and a head 5 which has a lower portion 6 of less diameter than the adjoining intermediate portion 7, the latter being of considerably greater diameter than the portion 6. The difference between the diameters of these two portions provides a shoulder at 8. The underside of the portion 6 has an annular flat surface and the lower edge of the portion 6 is rounded as indicated at 9 to facilitate the entry of the portion 6 into the opening of the annular washer 1. The said opening is of a diameter slightly greater than that of the diameter of the portion 6, in consequence of which the washer may be rotatably adjusted upon the said portion 6. The outer edge portion of the intermediate part 7 of the head of the screw may be regarded in effect as a flange and it is provided in its peripheral edge with notches 10. These notches extend entirely around the peripheral edge of the part 7 and are located at short intervals with respect to each other. The central portion of the intermediate part 7 is provided with a projection 11 which may be dome-shaped or of any other desired shape having a slot or notch 12 adapted to be engaged by a suitable instrumentality, such as a screw-driver, for turning the screw. It will be understood that before inserting the screw into an opening the washer 1 is placed in position thereon so that when the screw is finaly screwed into its final position with the lower side of the portion 6 clamped against the member to be held the washer will be located in the space between the said member and the shoulder 8 and may be adjusted rotatably about the portion 6. In the construction as illustrated in Figs. 1, 2 and 4 to 7, the device is employed for fastening electric terminals in place upon holders or supports therefor.

Referring to Figs. 1 to 5 a terminal 15 of known construction is shown having a tubular portion 16 and a flattened portion 17. The flattening out of the tubular portion 16 to form the flattened portion 17 provides a shoulder-like portion 18. The terminal is supported upon a support 20 which as illustrated is in the form of a plate. It is provided with a screw-threaded opening 21 with which the screw-threaded portion 4 of the screw engages. The screw-threaded portion 4 of the screw passes through the opening provided in the flattened portion 17 of the terminal, and the under side of the portion 6 of the screw head clamps upon or against the upper side of the flat portion 17 and holds the terminal in any desired position.

Figure 2:
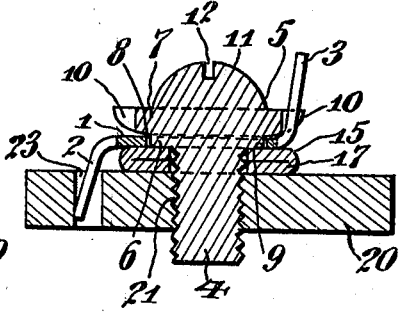
Fig. 2 is a transverse section taken on the line 2—2 of Fig. 1.
Figure 3:
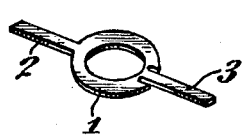
Fig. 3 is a view in perspective of the annular washer device having projecting fingers which are adapted to engage portions of the structure including the screw to prevent backing out rotation of the latter.

In the construction as shown in Figs. 1 and 2, the plate 20 is provided with an opening 23 into which the finger 2 of the washer 1 is adapted to be inserted as shown in Fig. 2. The opposite finger 3 is bent upwardly into engagement with one of the slots 10 in the periphery of the intermediate or middle portion 7 of the screw head. The thickness of the washer 1 is slightly less than the length of the portion 6 of the head of the screw, in consequence of which the shoulder 8 does not clamp upon the said washer when the screw has been inserted as far as it will go. It follows therefore that the washer 1 may be rotatably adjusted about the portion 6 so as to bring it into position to permit the insertion of the finger or projection 2 into the opening 23. With the said finger 2 projecting into the opening 23 and with the finger 3 bent upwardly into engagement with a notch 10 in the periphery of the middle or intermediate portion 7 of the screw, it will be apparent that the screw is held against rotation and maintains its clamping relationship to the flat portion 17 of the terminal 15 so as to hold the latter against accidental movement. The under side of the outer edge portion of the intermediate part of the head 5 is beveled or curved upwardly as shown, so as to facilitate the bending of the finger 3 upwardly into one of the notches of said edge. When it is desired to turn the screw, the finger 3 is merely bent downwardly out of the notch with which it is in engagement, whereupon the lower rounded portion of the head may pass thereover when the screw is turned.

Figure 4:
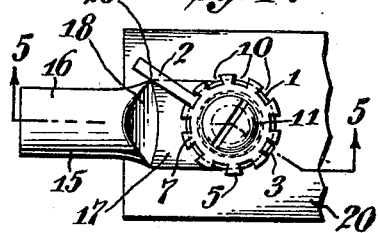
Fig. 4 is a view in top plan similar to that shown in Fig. 1 but showing a modified arrangement for preventing unscrewing or backing out movement of the screw.
Figure 5:
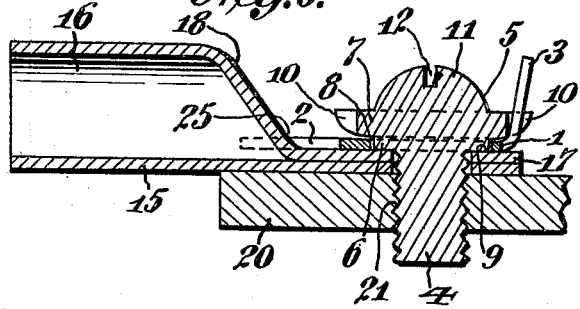
Fig. 5 is a longitudinal sectional view taken on the angular dash line 5—5 of Fig. 4.

The construction as illustrated in Figs. 4 and 5 is identical with that shown in Figs. 1 and 2 except that the plate or holder 20 is not provided with an opening corresponding to the opening 23, and to prevent rotation of the screw to effect backing out thereof the finger or projection 2 is positioned in contact with an edge of the shoulder 18 of the terminal 15 as indicated at 25. The projection 3, as in Figs. 1 and 2, is bent upwardly into engagement with one of the notches 10 as shown in Fig. 5. It will be apparent that as long as the finger or projection 3 remains in engagement with a notch as shown in Fig. 5, rotation of the screw in an anti-clockwise direction to effect backing out thereof is prevented.

Figure 6:
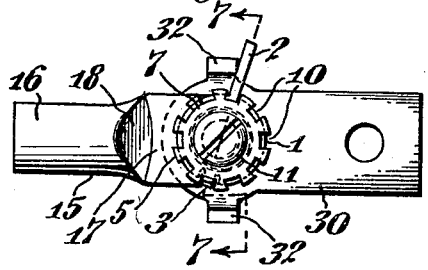
Fig. 6 is a top plan view showing another modified construction of an arrangement embodying the invention.
Figure 7:
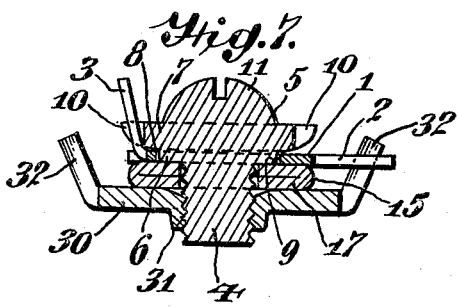
Fig. 7 is a transverse sectional view taken on the line 7—7 of Fig. 6.

In the construction as illustrated in Figs. 6 and 7 the plate or holder 30, having a screw-threaded opening 31 to receive the screw-threaded portion 4 of the screw, is somewhat thinner than the corresponding plate 20 of the preceding figures of the drawing and is provided with oppositely disposed projections 32. In this construction, as in those illustrated in Figs. 1, 2, 4 and 5, the washer is located upon the upper side of the flat portion 17 of the terminal 15 with the portion 6 of the screw head projecting into the opening of the washer 1. The washer 1 may be adjusted in such position upon the portion 6 that when the screw has been screwed into the holder 30 to clamp against the flat portion 17 of the terminal to hold the latter in position, the finger or projection 2 will be located in contact with one of the projections 32 as shown in Fig. 7. With the finger or projection 3 in engagement with the slot or notch 10 in the periphery of the middle portion 7 of the screw it will be apparent that the screw cannot be rotated in an anti-clockwise direction to effect backing out thereof. The contact of the finger 2 with a projection 32 at the right side of Fig. 7 will prevent such rotation. The same result would follow if the washer 1 were so adjusted as to place the projection 2 in contact with the rear edge, having reference to Fig. 7 of the drawing, of the projection at the left hand side of Fig. 7.

Figure 8:
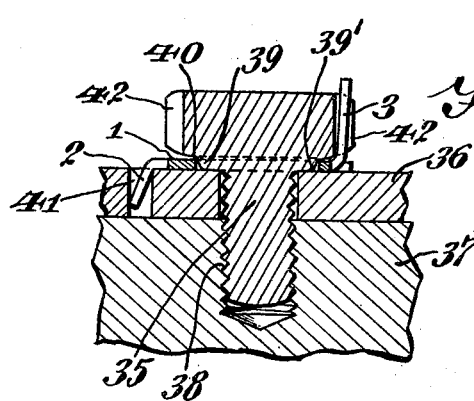
Fig. 8 is a sectional view showing still another modified construction of device embodying the invention.

In Fig. 8, I have shown a construction comprising a cap-screw 35 employed for securing a plate 36 to a member 37, the latter having a screw-threaded opening 38 therein for the reception of and engagement with the screw-threaded portion of the screw 35. The head of the cap-screw has a tapered reduced lower end portion 39, the said portion being in effect of inverted truncated cone shape and of substantially less diameter than the remaining portion of the head. The lower edge of the tapered portion 39 is slightly rounded as indicated at $39^1$. The length of the portion 39 is slightly greater than that of the thickness of the washer 1, in consequence of which when the cap-screw is screwed into place as shown in Fig. 8 with the tapered reduced portion 39 projecting through the opening of the washer 1, the shoulder 40 of the head does not clamp against the washer 1 so that the latter may be rotatably adjusted about the portion 39 to locate the finger or projection 2 in position to permit its insertion into the opening 41 in the plate 36. When the finger 2 projects into the hole 41 and the finger 3 is bent upwardly into engagement with one of the notches 42 which are provided at intervals in the outer edge of the head of the screw, it will be apparent that rotation of the screw relatively to the part 36 is prevented.

It will be seen that by my invention I have provided a device wherein a portion of the head of the holding screw projects into an opening provided in the fastening washer, although the washer is not clamped against rotation. This arrangement permits adjustment of the washer into any position desired and also prevents the pressing of the head upon the washer which sometimes results in bending or curling up of the outer edge of the washer which might result in a withdrawal of the finger 2 from the opening 23 or 41, or away from the shoulder 18 or stop 32.

In the foregoing description of my invention I have described the washer 1 as being rotatably adjustable about the portions 6 and 39, setting forth that the adjustment of the washer may be effected after the screw is screwed into clamping position. In the use of the device, however, and in practice the finger 2 has been in the past and usually will be in the future bent into the opening 23 or 41 as the case may be, after which the screw will be screwed down into clamping position. In the construction embodying my present invention no clamping action or pressure is exerted upon the washer, in consequence of which there is no tendency of the outer edge of the washer to bend or curl upwardly and therefore the tongue or projection 2 remains in engagement with the hole or opening 23 or 41, or the stop 18 or 32, as the case may be; whereas, in previous constructions when the head of the screw clamped upon the washer to cause the outer edges thereof, in many cases, to curl or bend upwardly, the projections were withdrawn from the said openings. As a result of that occurrence, the device in some instances failed to perform its proper function of preventing rotation of the screw to prevent backing out thereof. It will be seen that I have illustrated two types of screws, namely, a machine screw and a cap screw, both of which are shown as having heads of upset type, but it will be understood that the invention is applicable to all kinds of screws, screw bolts and machine screw nuts, made by upsetting metods or milled from solid bars.

Having thus described my invention what I claim and desire to secure by Letters Patent is:

1. Screw locking means comprising a screw the lower side of the head of which consists of a portion of reduced diameter as compared with the adjoining portion of the said head, and a fastening washer, the thickness of which is less than the length of said portion of reduced diameter, adjustably mounted upon the said reduced portion, said washer having means for locking engagement with a non-rotatable member and also having means for locking engagement with the head of said screw.

2. Screw locking means comprising a screw having a head comprising a clamping portion upon its under side of less diameter than the adjoining upper portion, the under side of the adjoining upper portion constituting a shoulder, an annular washer mounted upon the first named portion of the said head and having a thickness less than the length of said clamping portion so as to be rotatably adjustable thereon, the said adjoining upper portion of the head being provided with notches in its periphery, the said annular washer having a finger adapted to be bent into engagement with any one of said notches, the said washer having another finger, and stationary means with which the said other finger is adapted to contact to prevent rotation of said screw to cause backing out movement thereof.

3. Screw locking means comprising a screw the lower side of the head of which is provided with a clamping portion of less diameter than the adjoining upper portion thereof, the lower outer edge of the said portion of less diameter being rounded and the portion of the adjoining upper portion of said head projecting outwardly and forming a shoulder, and a fastening washer adjustably mounted upon the said clamping portion and having a thickness less than the length of said clamping portion, said washer having means for preventing rotation of the said screw to unscrew the same.

4. In a locking device for screws and the like, the combination of a screw having a head the lower side of which is provided with a clamping portion of less diameter than the adjoining upper portion thereof, the said head having notches in the outer edge thereof, an annular washer mounted on the said clamping portion and having a thickness less than the length of said clamping portion, said washer having fingers projecting outwardly from the edge thereof one of said fingers adapted to be bent into engagement with one of said notches, a support, and an electric terminal mounted on said support and held in selected fixed position by said screw, the said terminal having a shoulder near the said screw with which the other of said fingers is adapted to contact to prevent rotation of said screw in a direction to cause backing out thereof.

5. In a locking device for screws and the like, the combination of a screw having a head the lower portion of which is of less diameter than the adjoining upper portion thereof and the outer edge of said head having notches therein, an annular washer mounted on the said portion of less diameter, the thickness of said washer being less than the length of the said portion of less diameter so that the washer may be rotatably adjusted upon said portion of less diameter, the said washer having fingers which project outwardly from the outer edge thereof one of said fingers adapted to be bent into engagement with one of said notches, a support having a projection extending upwardly therefrom in spaced relation to the said screw, and a member adapted to be secured and held by said screw on said support, the other of the fingers of said washer contacting with said projection to prevent rotation of said screw in a direction to cause backing out thereof from said support.

6. In screw locking means a screw having a head the lower side of which is provided with a portion of less diameter than the adjoining upper portion thereof, the first named portion being of cylindrical shape with its lower outer edge rounded and the lower side thereof having an annular flat surface, the said adjoining upper portion constituting a shoulder the outer lower edge of which is rounded and tapered upwardly and the outer edge of said adjoining upper portion having notches therein, a fastening washer adjustably mounted upon the said portion of less diameter said washer having means for engaging a fixed member in adjoining relation to the screw, and means for engaging any one of the said notches.

In testimony that I claim the foregoing as my invention I have hereunto signed my name this 28th day of November, A. D. 1930.

WILLIAM JAMES GIBBONS.